United States Patent [19]

Saito et al.

[11] 4,292,414

[45] Sep. 29, 1981

[54] PROCESS FOR THE PREPARATION OF MODIFIED BLOCK COPOLYMERS

[75] Inventors: Akira Saito, Fujisawa; Akio Yamori; Toshio Ibaragi, both of Kawasaki, all of Japan

[73] Assignee: Asahi Kasei Kogyo Kabushiki Kaisha, Osaka, Japan

[21] Appl. No.: 89,237

[22] Filed: Oct. 29, 1979

[30] Foreign Application Priority Data

Aug. 16, 1978 [JP]  Japan .................................. 53/99102
Oct. 31, 1978 [JP]  Japan ................................ 53/133244

[51] Int. Cl.$^3$ .............................................. C08L 53/02
[52] U.S. Cl. .................................... 525/255; 525/256; 525/257; 525/259; 525/261; 525/266; 525/285; 525/301; 525/386
[58] Field of Search ............... 525/285, 386, 301, 255, 525/257, 259, 261, 266, 256

[56] References Cited

U.S. PATENT DOCUMENTS 3,714,295  1/1973  Nakayama ........................... 525/285
4,033,888  7/1977  Kiovsky et al. ...................... 525/285

FOREIGN PATENT DOCUMENTS

50/56427  5/1975  Japan .
52/123443  10/1977  Japan .

*Primary Examiner*—Carman J. Seccuro
*Attorney, Agent, or Firm*—Birch, Stewart, Kolasch & Birch

[57] ABSTRACT

A process for preparing a modified block copolymer by graft-reacting at least one maleic acid compound with an aromatic vinyl compound/conjugated diene compound block copolymer containing at least one polymer block mainly composed of a conjugated diene compound and at least one polymer block mainly composed of an aromatic vinyl compound, the aromatic vinyl compound/conjugated diene compound weight ratio being within the range of 5/95 to 97/3, characterized in that said graft-reaction is carried out under conditions wherein the generation of radicals can be substantially inhibited. According to this process, it is possible to prevent gelation of the product in the graft-reaction, and the modified block copolymer obtained has excellent appearance characteristics, mechanical properties, and transparency.

23 Claims, No Drawings

PROCESS FOR THE PREPARATION OF MODIFIED BLOCK COPOLYMERS

BACKGROUND OF THE INVENTION

This invention relates to a novel process for the preparation of block copolymers modified by a maleic acid compound. More particularly, it relates to a novel process for preparing a thermoplastic polymer with excellent melt-flow characteristics, tensile strength, etc., by modifying a block copolymer composed of a conjugated diene compound and an aromatic vinyl compound with a maleic acid compound.

It is known that a block copolymer can be obtained by an anionic copolymerization of a conjugated diene compound and an aromatic vinyl compound by using an organic alkali metal initiator. These types of block copolymers are diversified in characteristics, ranging from rubber-like characteristics to resin-like characteristics, depending on the content of the aromatic vinyl compound.

When the content of the aromatic vinyl compound is small, the produced block copolymer is a so-called thermoplastic rubber. It is a very useful polymer which shows rubber elasticity in the unvulcanized state and is appliable for various uses such as moldings of shoe sole, etc.; impact modifier for polystyrene resins; adhesive; binder; etc.

The block copolymers with a high aromatic vinyl compound content, such as more than 70% by weight, provide a resin possessing both excellent impact resistance and transparency, and such a resin is widely used in the field of packaging. Many proposals have been made on process for the preparation of these types of block copolymers (Japanese Patent Publication Nos. 28915/72, 4106/73, etc.).

Also, many attempts have been made for the purpose of improving adhesiveness, green strength and other properties by modifying said resin or rubber with a maleic acid compound having high funactionality, and various methods have been proposed for modifying synthetic conjugated diene rubbers with a maleic acid compound (maleinizing). For instance, Japanese Patent Kokai (Laid-Open) No. 20294/74 shows a method for modifying polyisoprene in an inert solvent in the presence of a radical initiator. The main disadvantage of this method lies in complicated after-treatments such as solvent removal, and the like. Japanese Patent Publication No. 32707/70 discloses a method according to which polyisoprene is masticated while subjecting it to shearing force in a screw extruder without using any radical initiator and then maleic anhydride is added thereto to maleinize the polymer. This method is superior to the above-mentioned maleinization in an inert solvent in that the former is simpler in steps, but this method cannot be applied to maleinization of the block copolymers as in the present invention because in the case of a block copolymer in which the conjugated diene portion is mainly composed of butadiene, there takes place crosslinking, or gelation, in the butadiene portion during the mastication operation in which strong shearing force is given. On the other hand, in the case of a block copolymer in which the conjugated diene portion is mainly composed of isoprene, mastication may cause splitting of the molecular chain in the isoprene portion, resulting in a loss of structural characteristics as block copolymer. Japanese Patent Kokai (Laid-Open) No. 56427/75 suggests a method for maleinizing butadiene-styrene block copolymer in the presence of a rubber-extending oil using a radical initiator or generating a radical by heating. Japanese Patent Kokai (Laid-Open) No. 123443/77 suggests a method for maleinizing a butadiene-styrene block copolymer along with polyethylene in a screw extruder in the presence of a radical initiator. In any of these methods, however, maleinization is performed under generation of a radical, and therefore, gelation of the modified block copolymer obtained is unavoidable, and properties as thermoplastic polymer, such as melt-flow characteristics or appearance characteristics, of said modified block copolymer are lowered.

SUMMARY OF THE INVENTION

As viewed above, there is not yet available an industrially acceptable method for modifying the conjugated diene compound-aromatic vinyl compound block copolymers with a maleic acid compound.

Under such circumstances, the inventors of this invention have made further studies for solving the above mentioned problems and have finally reached the present invention.

According to this invention, there is provided a process for preparing a modified block copolymer by graft-reacting at least one maleic acid compound with a block copolymer which contains at least one polymer block mainly composed of a conjugated diene compound and at least one polymer block mainly composed of an aromatic vinyl compound, the aromatic vinyl compound/conjugated diene compound weight ratio being within the range of 5/95 to 97/3, characterized in that said graft-reaction is carried out under the conditions wherein the generation of radicals can be substantially inhibited.

The feature of this invention lies not only in providing a process for the industrial production of modified block copolymers without quality deteriorations such as gelation, but also providing the epochal modified block copolymers which are excellent in appearance characteristics such as color tone and surface gloss; melt-flow characteristics; mechanical properties such as tensile strength and impact resistance; transparency; etc.

The conjugated diene compound-aromatic vinyl compound block copolymer (hereinafter referred to as block copolymer) which is the precursor of the modified block copolymer according to this invention must contain at least one polymer block mainly composed of a conjugated diene compound and at least one, preferably two or more, polymer blocks mainly composed of an aromatic vinyl compound, wherein the aromatic vinyl compound/conjugated diene compound weight ratio in said block copolymer is limited to the range of from 5/95 to 97/3, and is preferably from 10/90 to 90/10, and is more preferably from 20/90 to 85/15. Regarding the polymer block mainly composed of a conjugated diene compound in the block copolymer according to this invention, the conjugated diene compound/aromatic vinyl compound weight ratio in such polymer block is limited to the range of from 100/0 to 60/40. In said polymer block, the distribution of the minor component aromatic vinyl compound in the molecular chain may be either at random or tapered (in the latter case the proportion of one of the monomers increases or decreases along the molecular chain), or may be partially in block or in combination of them. As for the polymer block mainly composed of an aromatic vinyl compound in the block copolymer of this invention, the aromatic vinyl compound/conjugated diene compound weight ratio is limited to the range of from 100/0 to 70/30, and 100/0 is preferred. In said polymer block, the distribution of the minor component conjugated diene compound in the molecular chain may be at random, tapered, partially in block or in combination of them.

In the block copolymers of this invention, the weight ratio of the polymer block mainly composed of an aromatic vinyl compound to the polymer block mainly composed of a conjugated diene compound is limited to the range of from 5/95 to 97/3, and it is preferably from 10/90 to 90/10, more preferably 20/90 to 85/15.

The above compositional limitations on the block copolymers of this invention are essential for allowing the starting block copolymer of this invention or the modified block copolymer obtained by maleinization to display thier characteristics as thermoplastic polymer, such as excellent melt-flow characteristics, tensile strength, etc.

The conjugated diene compound which is one of the constitutents of the block copolymer of this invention comprises at least one monomer selected from butadiene, isoprene, pentadiene and the like. Such a compound or compounds are incorporated as a conjugated diene compound polymer block in the form of polybutadiene, polyisoprene or butadiene-isoprene copolymer, but incorporation in the form of polybutadiene is most preferred.

The aromatic vinyl compound which is the other constituent of the block copolymer of this invention comprises one or more compounds selected from styrene, α-methylstyrene, vinyltoluene, etc. Styrene is preferred.

The most preferred form of the block copolymer of this invention is styrene-butadiene block copolymer.

The starting block copolymer used in this invention has a number-average molecular weight within the range of 10,000 to 1,000,000, preferably 20,000 to 300,000, more preferably 50,000 to 200,000 and the molecular weight distribution (ratio of weight-average molecular weight to number-average molecular weight) is preferably within the range of 1.01 to 10.

The molecular structure of the block copolymer used in this invention may be straight-chained, branched or radial, and it may be slightly modified by an organic or inorganic compound so far as the thermoplastic polymer characteristics are not lost.

When butadiene is used as the conjugated diene compound in the block copolymer used in this invention, the microstructure of the butadiene portion is preferably such that the cis-1,4 content is 20–50% and the 1,2 content is 5–40%.

The starting block copolymer used in this invention can be obtained by block-copolymerizing a conjugated diene compound and an aromatic vinyl compound in an inert hydrocarbon solvent such as benzene, toluene, hexane, cyclohexane, or the like by using an organic lithium compound such as butyllithium or the like as a catalyst. It is also possible to form a branched or radial block copolymer by reacting an active lithium-terminated block copolymer with a polyfunctional coupling agent such as carbon tetrachloride, silicon tetrachloride, or the like. In this invention, all the block copolymers obtained by any polymerization method can be used as far as such copolymers meet the above-said requirements.

These block copolymers may be used not only singly but also in combination of two or more. As examples of said combination, there may be cited a combination of styrene-butadiene block copolymer and styrene-isoprene block copolymer, a combination of two styrene-butadiene block copolymers which are different in molecular weight, a combination of two styrene-butadiene block copolymers which are different in styrene content, a combination of styrene-butadiene block copolymers which are different in block structure, such as a combination of styrene-butadiene-styrene three-segment block copolymer and butadiene-styrene-butadiene-styrene four-segment block copolymer, and other combinations.

The maleic acid compound used in this invention is selected from maleic acid, maleic anhydride, half alkyl ester of maleic acid, maleic amide, maleic imide, etc., among which maleic anhydride is preferred.

Now, the process for producing the modified block copolymers of this invention will be described.

The present modified block copolymer having a maleic acid compound grafted thereon can be prepared by graft-reacting the starting block copolymer defined in this invention with a maleic acid compound under the conditions that substantially no radical is generated, and said graft-reaction can be favorably accomplished in the absence of any radical initiator and under the melt-mixing conditions which can substantially inhibit generation of a radical.

Various methods may be conceived for fulfilling the "melt-mixing conditions which can substantially inhibit generation of a radical" which are required in practicing the process of this invention. In a preferred method, the block copolymer is melted while preventing generation of a radical by performing the reaction without any radical initiator in the presence of a radical inhibitor. In a more preferred method, the above melting is conducted while adjusting the reaction temperature and reaction time so as not to give any excessive shearing force. It is possible by these methods to prevent the undesirable gelation of the block copolymer or the splitting of molecular chains.

In the reaction where a maleic acid compound is grafted, it is not recommended to add a radical initiator such as a peroxide or an azo compound, for example, azobisisobutyronitrile in the reaction system in order to avoid gelation of the block copolymer.

It is preferable, on the other hand, to add a gelation inhibitor of a phenol type, phosphorus type, amine type or the like for depressing the radical which is generated upon heating or under high shearing action during the reaction. Although the use of these additives alone may bring about an effect, it is preferred to use two types, and more preferably three types, of these additives in combination. Most preferred is the use of a three-component system consisting of a phenol type compound, a phosphorus type compound and still another type of compound. As examples of the phenol type compounds usable in this invention, there may be mentioned 2,6-di-tert-butyl-4-methylphenol, 2,2'-methylenebis(4-methyl-6-tert-butylphenol), 4,4'-butylidenebis-(3-methyl-6-tert-butylphenol), 4,4'-thiobis(3-methyl-6-tert-butylphenol), n-octadecyl-β-(4'-hydroxy-3',5'-di-tert-butylphenyl) propionate, etc. Examples of the phosphorus type compounds include tri(nonylphenyl) phosphite, tridecyl phosphite, distearylpentaerythrityl diphosphite, etc. As the still another type of compound, there may be used naphthol type compounds such as 1,2-dihydroxynaphthalene, 1-amino-2-naphthol, 1-nitro-2-naphthol, etc., amine type compounds such as trimethylamine, phenyl-β-naphthylamine, p-phenylenediamine, mercaptoethylamine, N-nitrosodimethylamine, phenothiazine, halo-dihydro-2,2,4-trimethylquinone, etc., sulfur type compounds such as dilaurylthio dipropionate, dilauryl sulfide, 2-mercaptobenzimidazole, 2-mercaptobenzothiazole, dibenzothiazyl disulfide, metallic salts of 2-mercaptobenzothiazole, diethylxanthogene disulfite, etc., quinone type compounds such as hydroquinone, urea type compounds, etc. It it also possible to use other types of compounds if they are capable of providing a similar effect.

Such a gelation inhibitor is added in an amount of 0.001 to 5 parts by weight, preferably 0.05 to 2 parts by weight, per 100 parts by weight of the block copolymer. It is, however, undesirable to use a compound which may react with the maleic acid compound to cause gelation.

A Banbury mixer or a screw extruder, preferably a single- or multi-screw extruder is favorably used as the reactor capable of providing suitable melt-mixing conditions in the graft-reaction of a maleic acid compound with a block copolymer in this invention. The feed of the block copolymer and the maleic acid compound into the screw extruder may be performed either separately or simultaneously, but for obtaining a homogenous modified block copolymer, it is recommended to mix them and then feed the mixture.

The operating conditions for the screw extruder most suitable as the reactor in this invention are as follows: the temperatures in the melt zone and the succeeding zones in the extruder are within the range of 150° to 280° C., preferably 180° to 250° C., more preferably 180° to 220° C., the average retention time in the extruder is within the range of 30 to 500 seconds, preferably 60 to 300 seconds, and the shearing rate in the extruder is not more than 180 sec$^{-1}$, preferably not more than 120 sec$^{-1}$, more preferably not more than 60 sec$^{-1}$, and it is essential that these conditions are capable of substantially inhibiting the formation of radicals in the extruder. An extruder temperature of less than 150° C. or a retention time of less than 30 seconds results in too low a percentage of the maleic acid compound grafted while an extruder temperature of more than 280° C. or a retention time of more than 500 seconds or a shearing rate of more than 180 sec$^{-1}$ may give rise to gelation of the block copolymer. Said shearing rate in the screw extruder results from calculation according to the method described in S. P. E. Journal, (June 1967), 53.

In the modified block copolymers obtained according to this invention, a maleic acid compound is grafted in an amount of 0.05 to 20% by weight, preferably 0.1 to 10% by weight, more preferably 0.1 to 10% by weight, on the block copolymer.

The ratio of the melt flow index of the modified block copolymer obtained according to this invention to that of the block copolymer before modification is preferably within the range of 0.025 to 2.0, more preferably 0.2 to 1.5. If said ratio is less than 0.025, in some cases there result poor melt-flow characteristics of the obtained modified block copolymer, while if such ratio is over 2.0, the mechanical properties such as tensile strength are sometimes deteriorated.

The amount of toluene insolubles in the modified block copolymer obtained according to this invention is not more than 1%, preferably not more than 0.5%.

However, when said modified block copolymer is reversibly cross-linked with a metallic salt or an acid anhydride, said melt flow index or the amount of toluene insolubles is measured after breaking said reversible crosslinkage by an acid treatment or other means.

In the preparation of the modified block copolymers according to this invention, it is possible to add, if necessary, an inorganic or organic compound or compounds to the reaction system along with said block copolymer and maleic acid compound. Such additives include stabilizers (antioxidants), tackifiers, plasticizers, fillers, lubricants, flame retardants, coloring matters and various types of high or low polymers. It is also possible to add a mono- or tri-valent metallic compound which is capable of forming an ionic bond with the maleic acid compound, or a vinyl monomer in such an amount that gelation is not induced.

To the modified block copolymers or the modified block copolymer compositions according to this invention may be added any suitable inorganic or organic compound or compounds as additives which include stabilizers, tackifiers, fillers, lubricants, flame retardants, coloring matters, crosslinking agents and other materials generally called reagent. A mono- to trivalent metallic compound or compounds capable of forming an ionic bond with the carboxylic acid group may also be used as additives.

As described above, the modified block copolymers obtained according to this invention have excellent mechanical properties such as tensile strength, transparency, etc., and can be used in the production of various kinds of moldings, for example, extrusion moldings such as sheets and films and in the thermoforming, for example, vacuum or pressure forming, thereof into shaped articles, for example, containers and packaging materials. They may also be molded into articles for daily use, toys, etc., by injection or blow molding.

This invention is further illustrated referring to Examples below, and the Examples are not by way of limitation but by way of illustration only.

EXAMPLES OF THE INVENTION

Example 1

Styrene and butadiene monomer solutions in cyclohexane were added successively in the order of styrene, butadiene and styrene to a cyclohexane containing butyl lithium as a polymerization catalyst under a nitrogen atmosphere and polymerized at a temperature of 60°–80° C. to obtain an S-B-S (styrene/butadiene/styrene=15/70/15) block copolymer (specimen a), and to this specimen a was added 2,6-di-tert-butyl-4-methylphenol as an antioxidant in an amount of 0.5 part by weight per 100 parts by weight of said specimen a. The melt flow index of this block copolymer (measured at 200° C. under a load of 5 kg; unit: g/10 min) was 11.8.

To the pellets of this specimen a were added 2 parts by weight of maleic anhydride and 0.3 part by weight of phenothiazine as a gelation inhibitor per 100 parts by weight of the block copolymer, and they were uniformly mixed by using a Henschel mixer and then fed into a single-screw extruder [screw diameter (D)=20 mmφ, L/D=22 (L: screw length)] to effect maleinization under the following conditions:

Screw speed: 30 r.p.m.
Extruder temperature:
   Cylinder $C_1$ (portion which is 12D from screw end): 220° C.

Cylinder C₂ (portion which is 5D from screw end): 200° C.
Die: 200° C.
Polymer retention time in cylinder: 180 sec
Shear rate: 20 sec⁻¹

The melt flow index of the maleinized block copolymer obtained (specimen A-1) was 6.7, and the content of the toluene insolubles was not more than 0.1% by weight. By titrating this polymer with sodium methylate to determine the acid content, it was found that the amount of maleic anhydride grafted on the polymer was 1.06% by weight, from which the conversion of the maleic anhydride was determined as 53%.

The block copolymer extruded from the extruder was subjected to 1-hour vacuum drying at 120° C. to remove the unreacted maleic anhydride. The amount of the unreacted maleic anhydride remaining in the block copolymer after vacuum drying, as determined as a result of acetone extraction, was less than 0.05% by weight of the polymer.

EXAMPLE 2

Styrene and butadiene monomer solutions in cyclohexane were added successively in the order of styrene, butadiene and styrene to a sufficiently nitrogen-substituted reactor containing dehydrated cyclohexane as a solvent and n-butyl lithium as a polymerization catalyst and polymerized at a temperature of 60°–80° C. to obtain an S-B-S (styrene/butadiene/styrene=40/20/40) block copolymer (specimen b), and to this specimen b was added 2,6-di-tert-butyl-4-methylphenol as an antioxidant in an amount of 0.5 part by weight per 100 parts by weight of the specimen b. It was analytically determined that the styrene content of the specimen b was 80.2% by weight and the melt flow index (measured at 200° C. under load of 5 kg) was 4.2 g/10 min.

Specimen b was pelletized and thereto were added 2.5 parts by weight of maleic anhydride, 0.5 part by weight of tri(nonylphenyl) phosphite and 0.3 part by weight of phenothiazine as a gelation inhibitor per 100 parts by weight of the specimen, after which they were mixed uniformly by means of a mixer.

This mixture was fed into a single-screw extruder (screw diameter=20 mm, L/D=22, full-flighted) under a nitrogen atmosphere and subjected to maleinization under the following conditions:
Screw speed: 35 r.p.m.
Extruder temperature:
 Cylinder C₁ (portion which is 12D from screw end): 210° C.
 Cylinder C₂ (portion which is 5D from screw end): 210° C.
 Die: 200° C.
Polymer retention time in cylinder: 150 sec
Shear rate: 25 sec⁻¹

The obtained polymer was subjected to 1-hour vacuum drying at 120° C. to remove the unreacted maleic anhydride. The melt flow index of maleinized block copolymer (specimen B-1) was 3.1, and the amount of the toluene insolubles was 0.08% by weight.

By titrating this polymer with sodium methylate, it was found that the amount of maleic anhydride grafted on the polymer was 1.18% by weight, from which the conversion of the maleic anhydride was determined as 47%.

Examples 3–6 and Comparative Examples 1–6

Maleinzation of various kinds of block copolymers was carried out in the same way as in Example 1. The reaction conditions used and the results obtained are shown in Table 1 in the columns of Examples 3 to 6, respectively.

By way of comparison there were prepared modified block copolymers by using the same screw extruder as used in Example 1 but under the conditions outside the scope of definitions given in this invention. The reaction conditions used in these comparative examples and the results obtained are shown in Table 2 in the columns of Comparative Examples 1 to 6, respectively.

In Example 3, there was used a radial block copolymer (specimen c) obatained by coupling the living lithium terminals of an S-B (styrene/butadiene=3/70) perfect block copolymer of the two blocks type with silicon tetrachloride, and in Example 4 and Comparative Examples 1 to 4 there was used a copolymer having a combined styrene content of 40% and a block styrene content of 30% (specimen d) obtained by a two-stage successive polymerization method in which first a butadiene-styrene tapered block was formed from a mixture of styrene/butadiene=20/20 in hexane by using butyllithium as a catalyst and then a second butadiene-styrene tapered block was formed from a mixture of styrene/butadiene=20/40 by adding it to the first polymerization system.

In Example 5 and Comparative Examples 5 and 6, there was used a styrene-isoprene perfect block copolymer of the three blocks type (styrene/isoprene/styrene=7.5/85/7.5) (specimen e), and in Example 6, there was used a styrene-butadiene perfect block copolymer of the three blocks type (styrene/butadiene/styrene=33/34/33) (specimen f).

As seen from the results of Tables 1 and 2, the modified block copolymers of Examples 3 to 6 obtained under the reaction conditions defined in this invention are extremely low in content of the toluene insolubles and have an excellent melt flow index, whereas the modified block copolymers of Comparative Examples 1-6 (specimens D-2 to D-5, E-2 and E-3) obtained under the conditions outside the defined range of this invention are all high in content of the toluene insolubles and poor in flow characteristics. The modified block copolymer obtained from the styrene-isoprene-styrene block copolymer of Comparative Example 6 is exceedingly high in melt flow index due to splitting of the isoprene chain.

Table 3 shows the properties of the modified block copolymers obtained in Examples 4 and 5 (specimens D-1 and E-1) and those obtained in Comparative Examples 2 and 6 (specimens D-3 and E-3) and of the unmodified block copolymers (specimens d and e) thereof.

It is noted from the results of Table 3 that the modified block copolymers obtained according to the process of this invention, as compared with the unmodified block copolymers, are appreciably improved in tensile strength (300% modulus) while maintaining good melt characteristics, but the modified block copolymers obtained from other methods than specified in this invention are poor in appearance and melt characteristics and little improved in tensile strength and other mechanical properties.

Also, specimen E-1 obtained from a styrene-isoprene-styrene block copolymer is slightly reduced in tensile strength, while specimen E-3 is exceedingly low in tensile strength due to splitting of the molecular chain.

TABLE 1

| | | Example 1 | Example 3 | Example 4 | Example 5 | Example 6 |
|---|---|---|---|---|---|---|
| | Specimen name | Specimen a | Specimen c | Specimen d | Specimen e | Specimen f |
| Block copolymer | Polymer structure (Note 1) | S—B—S (Perfect 3-blocks type) | (S—B)$_4$ (Radial) | B—S—B—S (Tapered 4-blocks type) (Note 6) | S—I—S (Perfect 3-blocks type) | S—B—S (Perfect 3-blocks type) |
| | Styrene content (wt %) | 30 | 30 | 40 | 15 | 66 |
| | Melt flow index (g/10 min) (Note 2) | 11.8 | 6.8 | 10.3 | 12.6 | 4.5 |
| Added amount (Note 4) | Maleic anhydride (Parts by weight) | 2 | 2 | 3 | 4 | 5 |
| | Gelation inhibitor (Note 3) (Parts by weight) | Phenothiazine 0.3 BHT 0.5 | Phenothiazine 0.2 BHT 0.5 | Phenothiazine 0.1 BHT 0.5 TNP 0.5 | BHT 0.5 | Phenothiazine 0.2 |
| | Dicumyl peroxide (Parts by weight) | 0 | 0 | 0 | 0 | 0 |
| Extruder conditions | Temperature (°C.) C$_1$ | 220 | 200 | 250 | 230 | 200 |
| | C$_2$ | 200 | 200 | 210 | 200 | 200 |
| | D | 200 | 200 | 200 | 200 | 200 |
| | Retention time (sec) | 180 | 300 | 180 | 180 | 250 |
| | Specimen name | Specimen A-1 | Specimen C-1 | Specimen D-1 | Specimen E-1 | Specimen F-1 |
| Modified block copolymer | Amount of maleic anhydride grafted (wt %) | 1.06 | 0.92 | 2.10 | 3.17 | 2.31 |
| | Melt flow index (Note 2) (g/10 min) | 7.7 | 4.1 | 7.2 | 13.2 | 4.0 |
| | Toluene insolubles (Note 5) (wt %) | 0.12 | 0.35 | 0.05 or less | 0.24 | 0.13 |

(Note 1) S: styrene block; B: butadiene block; I: isoprene block.
(Note 2) Measured according to ASTM-D-1238 G (at 200° C. under a load of 5 kg).
(Note 3) BHT: 2,6-di-tert-butyl-4-methylphenol; TNP: tri(nonylphenyl) phosphite
(Note 4) Parts by weight per 100 parts by weight of the block copolymer.
(Note 5) Matters which did not pass the 100-mesh wire gauze.
(Note 6) Block styrene content: 30%.

TABLE 2

| | | Comparative Example 1 | Comparative Example 2 | Comparative Example 3 | Comparative Example 4 | Comparative Example 5 | Comparative Example 6 |
|---|---|---|---|---|---|---|---|
| | Specimen name | Specimen d | Specimen d | Specimen d | Specimen d | Specimen e | Specimen e |
| Block copolymer | Polymer structure | B—S—B—S (tapered 4-blocks type) | B—S—B—S (tapered 4-blocks type) | B—S—B—S (tapered 4-blocks type) | B—S—B—S (tapered 4-blocks type) | S—I—S (perfect 3-blocks type) | S—I—S (perfect 3-blocks type) |
| | Styrene content (wt %) | 40 | 40 | 40 | 40 | 15 | 15 |
| | Melt flow index (g/10 min) | 10.3 | 10.3 | 10.3 | 10.3 | 12.6 | 12.6 |
| Additives | Maleic anhydride (parts by weight) | 2 | 2 | 2 | 2 | 1 | 2 |
| | Gelation inhibitor (parts by weight) | Phenothiazine 0.3 | Phenothiazine 0.3 | Phenothiazine 0.3 | 0 | 0 | 0 |
| | Dicumyl peroxide (parts by weight) | 0 | 0.1 | 0 | 0 | 0.1 | 0 |

TABLE 2-continued

| | | | | | | | | |
|---|---|---|---|---|---|---|---|---|
| Extruding conditions | Temperature (°C.) | C$_1$ | 300 | 200 | 200 | 230 | 200 | 200 |
| | | C$_2$ | 280 | 200 | 200 | 200 | 200 | 200 |
| | | D | 230 | 200 | 200 | 200 | 200 | 200 |
| | Retention time (sec) | | 180 | 180 | 600 | 180 | 180 | 600 |

| | Specimen name | Specimen D-2 | Specimen D-3 | Specimen D-4 | Specimen D-5 | Specimen E-2 | Specimen E-3 |
|---|---|---|---|---|---|---|---|
| Modified block copolymer | Amount of maleic anhydride grafted (wt %) | 1.72 | 1.90 | 1.32 | 1.60 | 0.88 | 1.80 |
| | Melt flow index (g/10 min) | 0.3 | 0.06 | 0.6 | 0.01 or less | 10.4 | 53.7 |
| | Toluene insolubles (wt %) | 11.6 | 14.3 | 5.1 | 69.0 | 3.2 | 1.63 |

TABLE 3

| | Example 4 | Example 5 | Comparative Example 2 | Comparative Example 6 | Unmodified block copolymer | Unmodified block copolymer |
|---|---|---|---|---|---|---|
| Specimen name | D-1 | E-1 | D-3 | E-3 | d | e |
| Melt flow index (g/10 min) | 7.2 | 13.2 | 0.06 | 53.7 | 10.3 | 12.6 |
| Toluene insolubles (wt %) | 0.10 | 0.24 | 14.3 | 1.63 | 0 | 0 |
| Amount of maleic anhydride grafted (wt %) | 2.10 | 3.17 | 1.90 | 1.80 | 0 | 0 |
| Appearance characteristics | Good | Good | Bad | Bad | Good | Good |
| Mechanical properties | 300% modulus* (kgf/cm$^2$) | 33 | 8 | 30 | 6 | 21 | 7 |
| | Tensile strength* (kgf/cm$^2$) | 201 | 140 | 165 | 70 | 136 | 210 |
| | Elongation at break (%) | 950 | 1200 | 700 | 750 | 1100 | 1300 |

Note
*Measured according to JIS-K-6301.

EXAMPLES 7-10, Comparative Examples 7-11

Maleinization of the block copolymers with a high styrene content was carried out by means of the same screw extruder as in Example 1, using specimen b in Example 7 and Comparative Examples 7-10, specimen g (a radial block copolymer with a styrene content of 75% obtained by coupling with silicon tetrachloride the active lithium terminal of the styrene-butadiene block copolymer obtained by using a butyllithium catalyst) in Example 8, specimen h (a styrene/butadiene/styrene block copolymer with a styrene content of 95% synthesized in the same way as for specimen b) in Example 9, and specimen i (a styrene/isoprene/styrene block copolymer with a styrene content of 80% synthesized in the same way as for specimen b) in Example 10 and Comparative Example 11, under the reaction conditions specified in this invention in Examples 7-10 and under the conditions other than specified in this invention in Comparative Examples 7-11. All of the block copolymers used in these Examples were perfect block copolymers. The results are shown in Tables 4 and 5.

TABLE 4

| | | Example No. | | | | |
|---|---|---|---|---|---|---|
| Items | | 2 | 7 | 8 | 9 | 10 |
| | Specimen name | Specimen b | Specimen b | Specimen g | Specimen h | Specimen i |
| Block copolymer | Polymer structure | S—B—S (Straight chain) | S—B—S (Straight chain) | (S—B)$_4$Si (Radial) | S—B—S (Straight chain) | S—I—S (Straight chain) |
| | Styrene content (wt %) | 80 | 80 | 75 | 95 | 80 |
| | Melt flow index (g/10 min) | 4.2 | 4.2 | 8.0 | 10.4 | 5.6 |
| Maleinization conditions | Reaction mixture | Block copolymer (parts by weight) | 100 | 100 | 100 | 100 | 100 |
| | | Maleic anhydride (parts | 2.5 | 5.0 | 2.5 | 1.0 | 2.0 |

TABLE 4-continued

| Items | | | Example No. 2 | 7 | 8 | 9 | 10 |
|---|---|---|---|---|---|---|---|
| | | by weight) Gelation inhibitor, type and amount (parts by weight) | BHT 0.5 TNP 0.5 Phenothi- azine 0.3 | BHT 1.0 Phenothi- azine 0.5 | BHT 0.5 TNP 0.5 Phenothi- azine 0.3 | BHT 0.5 Phenothi- azine 0.1 | BHT 0.5 |
| | | Dicumyl peroxide (parts by weight) | 0 | 0 | 0 | 0 | 0 |
| | Ext- rudor condi- tions | Tem- perature (°C.) $C_1$ $C_2$ D | 210 210 200 | 200 200 200 | 220 200 200 | 200 200 200 | 200 200 200 |
| | | Retention time (sec) | 150 | 360 | 180 | 120 | 180 |
| | | Specimen name | Specimen B-1 | Specimen B-2 | Specimen G-1 | Specimen H-1 | Specimen I-1 |
| Modified block copolymer | | Amount of maleic anhydride grafted (wt %) | 1.18 | 2.08 | 1.40 | 0.31 | 1.06 |
| | | Melt flow index (g/10 min) | 3.1 | 2.4 | 5.3 | 7.2 | 6.3 |
| | | Toluene insolubles (wt %) | 0.08 | 0.26 | 0.16 | 0.11 | 0.06 |

TABLE 5

| Items | | | Comparative Example No. 7 | 8 | 9 | 10 | 11 |
|---|---|---|---|---|---|---|---|
| | | Specimen name | Specimen b | Specimen b | Specimen b | Specimen b | Specimen i |
| Block copolymer | | Polymer structure | S—B—S (Straight chain) | S—B—S (Straight chain) | S—B—S (Straight chain) | S—B—S (Straight chain) | S—T—S (Straight chain) |
| | | Styrene content (wt %) | 80 | 80 | 80 | 80 | 80 |
| | | Melt flow index (g/10 min) | 4.2 | 4.2 | 4.2 | 4.2 | 5.6 |
| Malei- niza- tion condi- tions | Reac- tion mix- ture | Block co- polymer (parts by weight) | 100 | 100 | 100 | 100 | 100 |
| | | Maleic anhydride (parts by weight) | 2.5 | 2.5 | 2.5 | 2.5 | 2.0 |
| | | Gelation inhibitor, type and amount (parts by weight) | BHT 0.5 TNP 0.5 Phenothi- azine 0.3 | BHT 0.5 TNP 0.5 Phenothi- azine 0.3 | BHT 0.5 TNP 0.5 Phenothi- azine 0.3 | — | BHT 0.5 |
| | | Dicumyl peroxide (parts by weight) | 0 | 0.1 | 0 | 0 | 0.1 |
| | Extru- der condi- tions | Tem- pera- ture (°C.) $C_1$ $C_2$ D | 300 300 220 | 200 200 200 | 200 200 200 | 230 200 200 | 200 200 200 |
| | | Retention time (sec) | 150 | 150 | 700 | 150 | 150 |
| | | Specimen name | Specimen B-3 | Specimen B-4 | Specimen B-5 | Specimen B-6 | Specimen I-2 |
| Modified block copolymer | | Amount of maleic anhydride grafted (wt %) | 1.95 | 2.21 | 1.50 | 0.96 | 1.36 |

TABLE 5-continued

| Items | | Comparative Example No. | | | | |
|---|---|---|---|---|---|---|
| | | 7 | 8 | 9 | 10 | 11 |
| | Melt flow index (g/10 min) | 0.2 | 0.09 | 0.5 | 0.01 or less | 40.7 |
| | Toluene insolubles (wt %) | 8.5 | 20.4 | 4.6 | 58.0 | 2.08 |

As seen from the results of Tables 4 and 5, the maleinized block copolymers of Examples 2 and 7–10 (specimens B-1, B-2, G-1, H-1 and I-1) obtained under the reaction conditions specified in this invention all contain less than 1% by weight of toluene insolubles and maintain a good melt flow index. On the other hand, when the maleinization reaction is carried out under reaction conditions other than specified in this invention, that is, by using a different temperature condition (Comparative Example 7), by allowing a radical generator to be present (Comparative Examples 8 and 11), by using a different reaction time (Comparative Example 9) or without using a radical inhibitor (Comparative Example 10), the resultant products are all intolerably high in content of toluene insolubles, and the products from Comparative Examples 7–10 (specimens B-3, B-4, B-5 and B-6) are low in melt flow index and are very bad in processability, while the product from Comparative Example 11 (specimen I-2) is exceedingly high in melt flow index due to the splitting of the isoprene chain in the polymer.

It is appreciated from the foregoing results that the said definitions of the reaction conditions in this invention are imperative for obtaining the desired modified block copolymers of this invention.

Table 6 shows mechanical strength and haze of the modified block copolymers obtained in Example 1 (specimen B-1) and Comparative Example 7 (specimen B-3) and of the specimen b which is a nonmodified block copolymer.

As is apparent from the results of Table 6, the modified block copolymers obtained according to the process of this invention are better in mechanical properties and substantially equal in transparency as compared with the unmodified block copolymer and the modified block copolymer obtained from said comparative example.

TABLE 6

| | No. | | |
|---|---|---|---|
| Item | Example 2 (Specimen B-1) | Comparative Example 7 (Specimen B-3) | Specimen b (unmodified) |
| Melt flow index[1] (g/10 min) | 3.1 | 0.2 | 4.2 |
| Tensile strength at yield[2] (kgf/cm$^2$) | 302 | 260 | 285 |
| Tensile strength at break[2] (kgf/cm$^2$) | 260 | 208 | 230 |
| Elongation at break[2] (%) | 20 | 3 | 25 |
| Izod impact strength[2] (kgf · cm/cm) | 2.8 | 1.6 | 2.0 |
| Haze[3] (%) | 3.1 | 8.3 | 3.0 |

Notes:
[1]Measured under the conditions of ASTM-D-1238 G.
[2]Measured according to JIS-K-6871.
[3]Measured according to JIS-K-6718 by using a 0.5 mm thick sheet.

EXAMPLE 11 AND COMPARATIVE EXAMPLE 11

Maleinization reaction of a mixture of block copolymers with different structures was carried out under the conditions shown in Table 7 by using the same type of extruder as in Example 1, and the results obtained were shown in Table 7. The results of another maleinization reaction conducted according to a method other than the process of this invention were also shown in Table 7 as Comparative Example 11.

As understood from the results of Table 7, the process of this invention is capable of producing a modified block copolymer composition with a minimized amount of toluene insolubles and excellent flow characteristics even in case of using a mixture of block copolymers with different structures. On the other hand, the composition obtained from the method of the comparative example was high in content of toluene insolubles and poor in fluidity.

TABLE 7

| Items | | | | | No. | |
|---|---|---|---|---|---|---|
| | | | | | Example 11 | Comparative Example 11 |
| Maleinization reaction conditions | Reaction mixture | Block copolymer | Specimen name | | Specimen a/specimen b | Specimen a/specimen b |
| | | | Amounts (wt parts) | | 50/50 | 50/50 |
| | | Maleic anhydride (wt parts) | | | 1.5 | 1.5 |
| | | Type and amount of gelation inhibitor (wt parts) | | | BHT 0.8 p-phenylenediamine 0.1 | BHT 0.5 p-phenylenediamine 0.1 |
| | | Amount of dicumyl peroxide (wt parts) | | | 0 | 0 |
| | Extruder conditions | Temperature (°C.) | | $C_1$ | 210 | 210 |
| | | | | $C_2$ | 200 | 200 |
| | | | | D | 200 | 200 |
| | | Retention time (sec) | | | 150 | 700 |
| Modified block copolymers | | Amount of maleic anhydride grafted (wt %)* | | | 0.62 | 1.65 |
| | | Melt flow index (g/10 min) | | | 3.1 | 0.06 |

TABLE 7-continued

| Items | No. Example 11 | Comparative Example 11 |
|---|---|---|
| Toluene insolubles (wt %) | 0.18 | 5.8 |

Note:
*wt % based on the total weight of the composition.

What is claimed is:

1. A process for preparing a modified block copolymer by graft-reacting at least one maleic acid compound with an aromatic vinyl compound-conjugated diene compound block copolymer containing at least one polymer block mainly composed of a conjugated diene compound at least one polymer block mainly composed of an aromatic vinyl compound, the aromatic vinyl compound/conjugated diene compound weight ratio being within the range of from 5/95 to 97/3, characterized in that said graft reaction is carried out by melt-mixing said block copolymer and maleic acid compound in the presence of a radical inhibitor without using any radical initiator while adjusting reaction temperatures and times wherein the generation of radicals can be substantially inhibited to obtain a modified block copolymer grafted with a maleic acid compound having a toluene insolubles content of not more than 1% by weight, and a ratio of melt flow index of said modified block copolymer to that of the block copolymer before modification of 0.025-2.0.

2. A process according to claim 1, wherein the aromatic vinyl compound-conjugated diene compound block copolymer contains at least two polymer blocks mainly composed of an aromatic vinyl compound and at least one polymer block mainly composed of a conjugated diene compound.

3. A process according to claim 1, wherein the weight ratio of the aromatic vinyl compound to the conjugated diene compound in the aromatic vinyl compound-conjugated diene compound block copolymer is within the range of from 10/90 to 90/10.

4. A process according to claim 1, wherein the weight ratio of the aromatic vinyl compound to the conjugated diene compound in the aromatic vinyl compound-conjugated diene compound block copolymer is within the range of from 20/80 to 85/15.

5. A process according to claim 1, wherein the number average molecular weight of the aromatic vinyl compound-conjugated diene compound block copolymer is within the range of 10,000 to 1,000,000.

6. A process according to claim 1, wherein the number-average molecular weight of the aromatic vinyl compound-conjugated diene compound block copolymer is within the range of 20,000 to 300,000.

7. A process according to claim 1, wherein the aromatic vinyl compound-conjugated diene compound block copolymer is a styrene-butadiene block copolymer.

8. A process according to claim 1, wherein the graft-reaction is carried out in the presence of a radical inhibitor in an amount of 0.001 to 5 parts by weight per 100 parts by weight of the block copolymer.

9. A process according to claim 1, wherein the graft-reaction is carried out in the presence of a radical inhibitor in an amount of 0.05 to 2 parts by weight per 100 parts by weight of the block copolymer.

10. A process according to claim 1, wherein the radical inhibitor is at least one member selected from the group consisting of phenol compounds, phosphorus compounds, naphthol compounds, amine compounds, quinone compounds and sulfur compounds.

11. A process according to claim 1, wherein the radical inhibitor is a combination of at least two compounds selected from phenol compounds, phosphorus compounds, naphthol compounds, amine compounds, quinone compounds and sulfur compounds.

12. A process according to claim 1, wherein the radical inhibitor is a combination of one compound selected from phenol compounds and phosphorus compounds with one compound selected from naphtol compounds, amine compounds, quinone compounds and sulfur compounds.

13. A process according to claim 1, wherein the radical inhibitor is a combination of one compound selected from phenol compounds, one compound selected from phosphorus compounds and one compound selected from naphthol compounds, quinone compounds, amine compounds and sulfur compounds.

14. A process according to claim 10, 11, 12 or 13, wherein the amine compound is selected from the group consisting of naphthylamine compounds, phenylenediamine compounds, mercaptoalkylamine compounds, N-nitrosoamine compounds, quinoline compounds and phenothiazine compounds.

15. A process according to claim 10, 11, 12 or 13, wherein the amine compound is phenothiazine.

16. A process according to claim 9, wherein the graft reaction is carried out in a screw extruder.

17. A modified block copolymer prepared by the process of claim 1.

18. A modified block copolymer prepared by the process of claim 2.

19. A modified block copolymer prepared by the process of claim 3.

20. A modified block copolymer prepared by the process of claim 5.

21. A modified block copolymer prepared by the process of claim 7.

22. A modified block copolymer prepared by the process of claim 12.

23. A modified block copolymer prepared by the process of claim 13.

* * * * *